(12) United States Patent  (10) Patent No.: US 9,216,774 B2
Belpaire et al.  (45) Date of Patent: Dec. 22, 2015

(54) INTERCONNECTED FOAM OR ADHESIVE LAYERS

(75) Inventors: Vincent Belpaire, Brussels (BE); Nicolas Brichet, Zurich (CH)

(73) Assignee: Sika Technology AG, Baar (CH)

( * ) Notice: Subject to any disclaimer, the term of this patent is extended or adjusted under 35 U.S.C. 154(b) by 422 days.

(21) Appl. No.: 13/055,869

(22) PCT Filed: Jul. 24, 2009

(86) PCT No.: PCT/EP2009/059534
§ 371 (c)(1),
(2), (4) Date: Apr. 19, 2011

(87) PCT Pub. No.: WO2010/010167
PCT Pub. Date: Jan. 28, 2010

(65) Prior Publication Data
US 2011/0189428 A1 Aug. 4, 2011

(30) Foreign Application Priority Data

Jul. 25, 2008 (EP) .................................... 08161173

(51) Int. Cl.
| | | |
|---|---|---|
| *B32B 3/24* | (2006.01) | |
| *B62D 29/00* | (2006.01) | |
| *B32B 3/26* | (2006.01) | |
| *B29C 45/16* | (2006.01) | |
| *B29C 37/00* | (2006.01) | |
| *B29C 65/00* | (2006.01) | |

(52) U.S. Cl.
CPC ........... *B62D 29/002* (2013.01); *B29C 37/0082* (2013.01); *B29C 45/1657* (2013.01); *B29C 66/303* (2013.01); *B32B 3/266* (2013.01); *Y10T 29/49947* (2015.01); *Y10T 428/24008* (2015.01); *Y10T 428/24331* (2015.01); *Y10T 428/24777* (2015.01); *Y10T 428/24793* (2015.01)

(58) Field of Classification Search
CPC .. B62D 29/002; B32B 3/266; B29C 45/1657; B29C 37/0082; B29C 66/303
USPC .................................. 428/132, 139, 163, 161
See application file for complete search history.

(56) References Cited

U.S. PATENT DOCUMENTS

| | | | | |
|---|---|---|---|---|
| 5,534,329 | A * | 7/1996 | Bunimovich et al. | 428/192 |
| 6,475,577 | B1 * | 11/2002 | Hopton et al. | 428/34.7 |
| 7,404,996 | B2 * | 7/2008 | Cowelchuk et al. | 428/140 |
| 2002/0174954 | A1 * | 11/2002 | Busseuil et al. | 156/349 |

(Continued)

FOREIGN PATENT DOCUMENTS

| | | |
|---|---|---|
| EP | 1122152 A2 | 8/2001 |
| EP | 1122156 B1 | 7/2003 |

(Continued)

OTHER PUBLICATIONS

International Search Report for PCT/EP2009/059534.

*Primary Examiner* — William P Watkins, III
(74) *Attorney, Agent, or Firm* — Harness, Dickey & Pierce PLC

(57) ABSTRACT

A reinforcement includes a material layer disposed on a carrier that includes integrally formed support features, such as ribs, holes, pins, or a combination thereof, and/or a connector pin that deforms to secure the material layer to the carrier. The support features reduce the weak interface between the material layer and the carrier by improving bonding of the material layer to the carrier.

9 Claims, 10 Drawing Sheets

(56) References Cited

U.S. PATENT DOCUMENTS

| | | | |
|---|---|---|---|
| 2006/0165482 A1* | 7/2006 | Olberding | 403/381 |
| 2008/0202674 A1* | 8/2008 | Schneider et al. | 156/238 |
| 2008/0219799 A1* | 9/2008 | Auriol et al. | 411/43 |

FOREIGN PATENT DOCUMENTS

| | | |
|---|---|---|
| EP | 1122155 B1 | 4/2006 |
| GB | 2375328 A | 11/2002 |
| WO | WO-2008/106342 A1 | 9/2008 |

\* cited by examiner

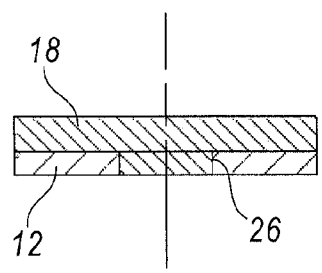 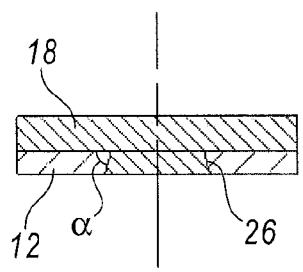 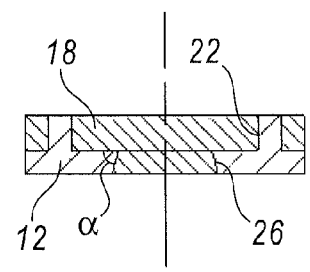
FIG. 7A     FIG. 7B     FIG. 7C
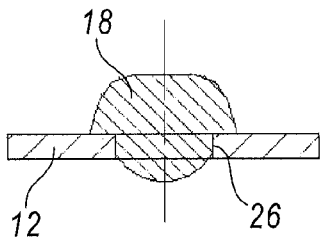 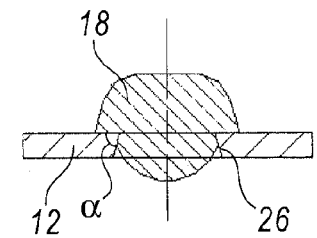 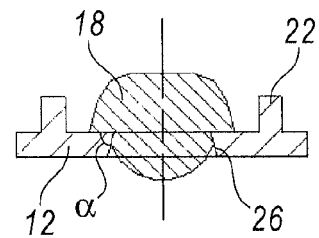
FIG. 8A     FIG. 8B     FIG. 8C

INTERCONNECTED FOAM OR ADHESIVE LAYERS

CROSS-REFERENCE TO RELATED APPLICATIONS

This application claims priority to EP application number 08161173.3 filed on Jul. 25, 2008, and International Application No. PCT/EP2009/059534 filed on Jul. 24, 2009, the entirety of which are hereby incorporated by reference.

BACKGROUND

Reinforcements are used in various industries to provide structural support to or reduce noise and/or vibrations in various products. The reinforcement may include a carrier disposed in a cavity of the product, and a material layer, such as structural or acoustic foam or an adhesive, is disposed on the carrier. The carrier may be made from plastic or metal bonded with the material layer. Accordingly, the material layer generally has adhesive properties.

Performance of the reinforcement may depend upon more than just the physical characteristics of the carrier and the material layer. In particular, a weak interface between the material layer and surfaces of the carrier may degrade the total performance of the reinforcement. Accordingly, an improved reinforcement is needed that strengthens the weak interface between the carrier and the material layer.

SUMMARY

A reinforcement includes a carrier having a plurality of walls extending between terminal ends. A support feature is disposed on the carrier, and a material layer is disposed on at least one of the plurality of walls. In addition, the material layer is at least partially supported by the support feature. Accordingly, the support feature reduces the weak interface between the material layer and the carrier by improving the bond between the material layer and the carrier.

BRIEF DESCRIPTION OF THE DRAWINGS

The foregoing description will be understood more completely from the following detailed description of the exemplary drawings, in which:

FIGS. 7A-7C are partial cross-sectional views of the reinforcement having various support features supporting a structural or acoustic foam, according to an embodiment;

FIGS. 8A-8C are partial cross-sectional views of the reinforcement having various support features supporting an adhesive, according to an embodiment;

DETAILED DESCRIPTION

Figure 1:
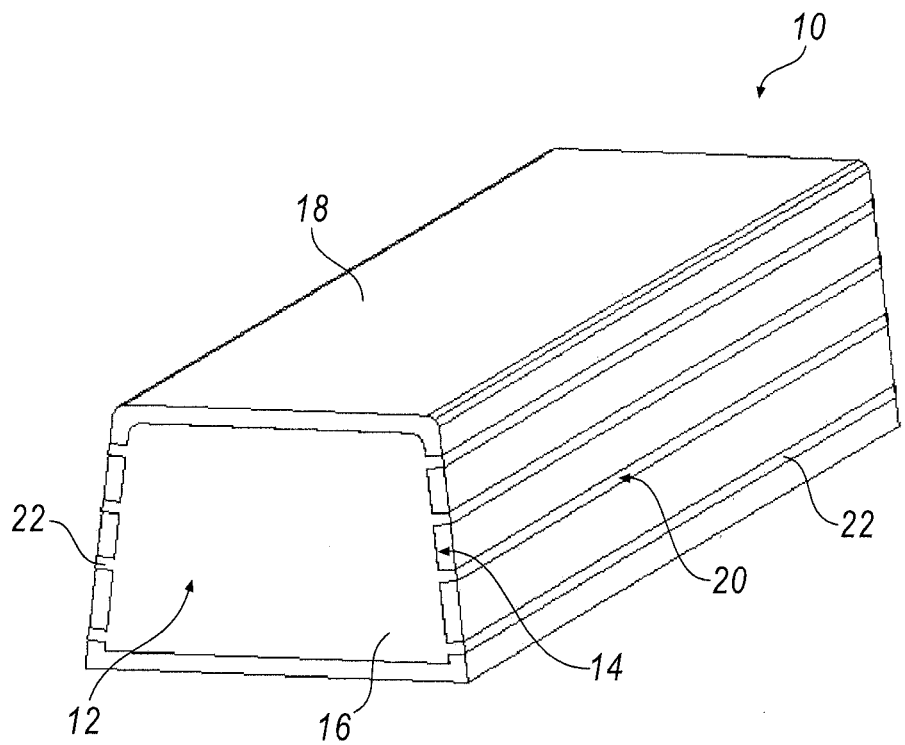
FIG. 1 is a perspective view of one embodiment of a reinforcement having a carrier with a support feature that includes a plurality of ribs, according to an embodiment.

A reinforcement includes a material layer disposed on a carrier. In one embodiment, the carrier includes integrally formed support features, such as ribs, pins, holes, or a combination thereof, to help support the material layer. In another embodiment, the support feature may include a connector pin that extends through the carrier and the material layer, and deforms to hold the two together. Modifying the geometry of various surfaces of the carrier or using the pin reduces the weak interface between the material layer and the carrier by improving bonding of the material layer to the carrier.

Referring to the Figures, where like numerals indicate like or corresponding parts throughout the several views, a reinforcement 10 includes a carrier 12 with a plurality of walls 14 extending between two terminal ends 16, and a material layer 18, such as structural foam, acoustic foam, or an adhesive, among others.

Figure 2:
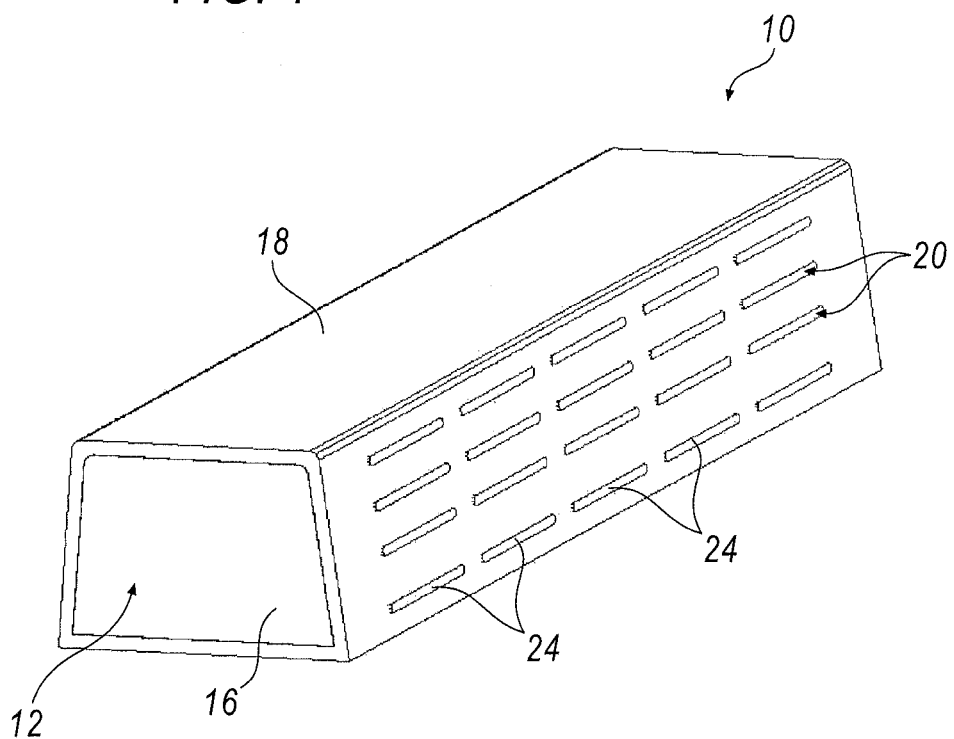
FIG. 2 is a perspective view of another embodiment of the reinforcement where the ribs are divided into a plurality of rib segments, according to an embodiment.
Figure 3:
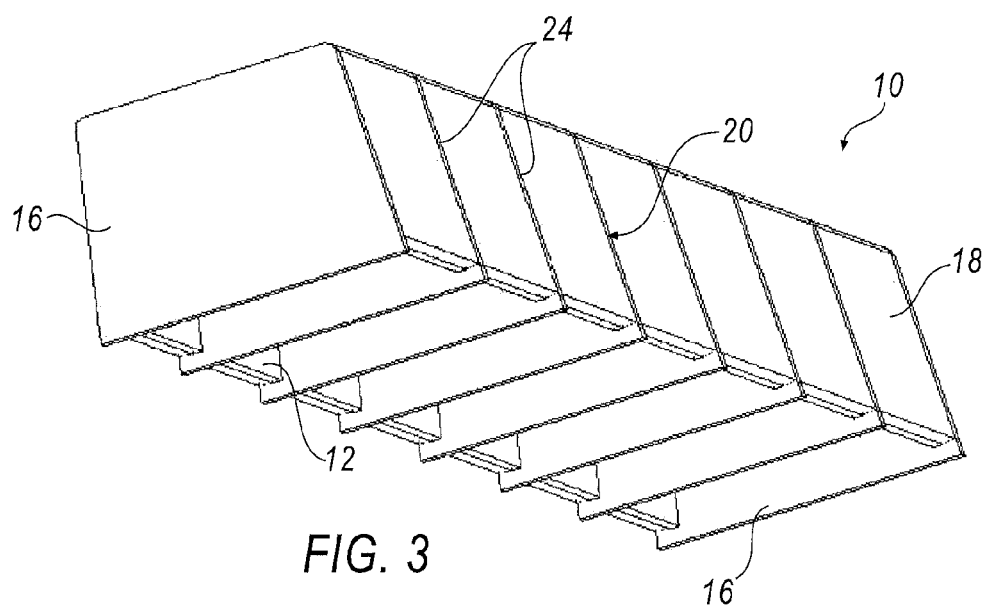
FIG. 3 is a perspective view of another embodiment of the carrier wherein the ribs are divided into the plurality of rib segments corresponding to internal rib positions of the carrier, according to an embodiment.

FIG. 1 is a perspective view of one embodiment of the reinforcement 10. The material layer 18 is disposed on the walls 14 of the carrier 12 and is at least partially supported by a support feature 20 that is integrally formed with the carrier 12. In this embodiment, the support feature 20 includes a plurality of ribs 22 integrally formed with and extending from a surface of one of the walls 14. As illustrated, the ribs 22 are parallel to and spaced from an edge of the wall 14, and extend continuously along a length of the wall 14 between the terminal ends 16 of the carrier 12. Moreover, the ribs 22 are laterally spaced from one another. For example, the ribs 22 may be oriented normal or oblique to a main shear direction. FIG. 2 is a perspective view of another embodiment of the reinforcement 10 where each rib 22 is divided into a plurality of rib segments 24 in line with and/or laterally spaced from one another. Alternatively, FIG. 3 is a perspective view of yet another embodiment of the reinforcement 10 where each rib 22 is divided into a plurality of rib segments 24 that correspond with internal rib positions of the carrier 12. The material layer 18 is then disposed on the carrier 12 between each of the rib segments 24. In either embodiment of FIGS. 1-3, the height of the ribs 22 may correspond to the thickness of the material layer 18. For instance, the height of expandable materials, like structural or acoustic foam, may be 2-6 mm, and specifically, 3-4 mm. For adhesives, the height may be 0.5-6 mm. The rib 22 height, therefore, may be 0.5-6 mm, but may generally be around 2 mm. The length of the rib 22 may be 20 to 50 mm, and the distance between each rib 22 may be 4 to 20 mm. Moreover, the rib 22 positions may correspond to an array of internal main ribs (not shown) or secondary ribs (not shown) forming the structural carrier 12.

Figure 4:
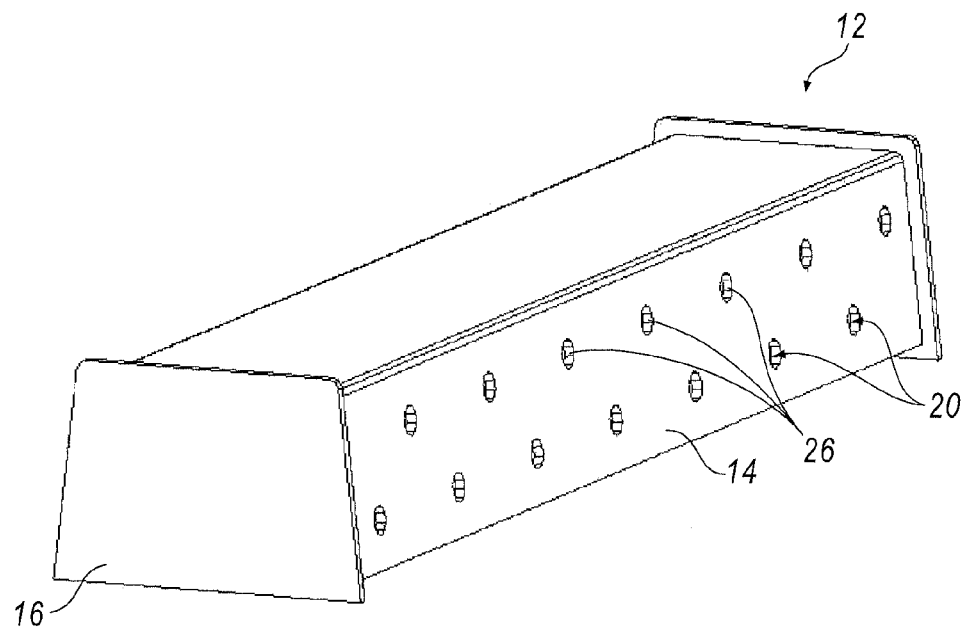
FIG. 4 is a perspective view of an embodiment of the carrier wherein the support feature includes a plurality of holes, according to an embodiment.
Figure 5:
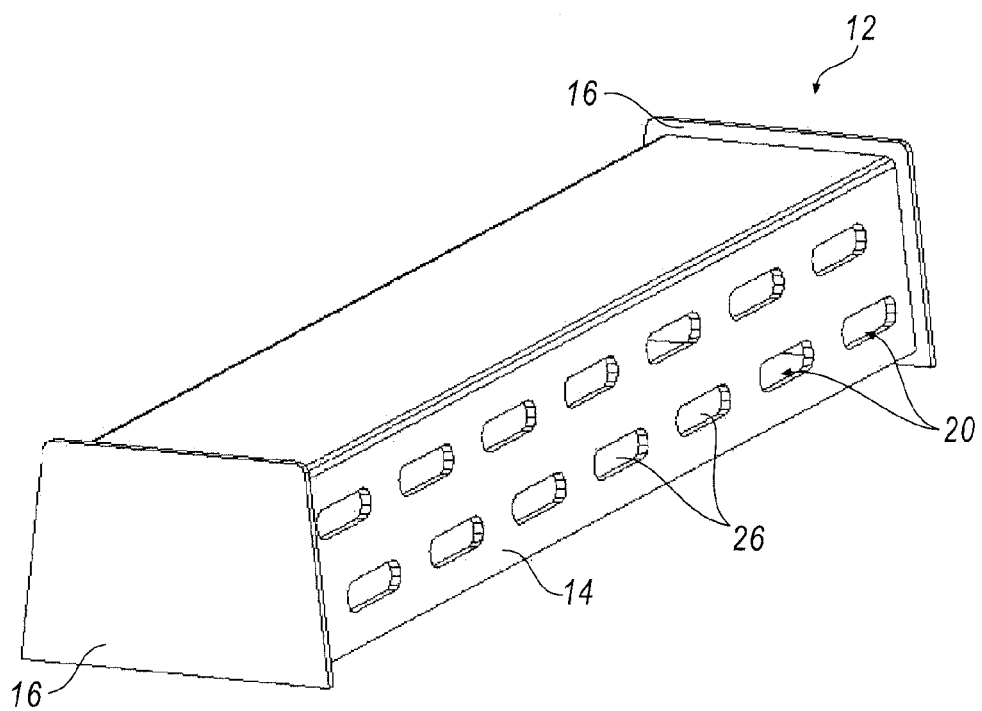
FIG. 5 is a perspective view of another embodiment of the carrier wherein the support feature includes the plurality of holes, according to an embodiment.

Referring now to FIG. 4, in one embodiment, the walls 14 of the carrier 12 define a plurality of holes 26 that may be used to, at least partially, support the material layer 18. The holes 26 are disposed on the outer surface of the carrier 12 and may form a pattern. Many patterns are possible, including aligning the holes 26, arranging the holes 26 in a zig-zag pattern, or randomly dispersing the holes 26 about the carrier 12. Moreover, the holes 26 may have different sizes and shapes. In the embodiment of FIG. 4, the holes 26 are substantially rounded, and may have a diameter of 3 to 6 mm. However, the diameter could be increased to 10 to 15 mm. In addition, as illustrated in FIG. 5, the holes 26 may be elongated (i.e., have two rounded edges connected by two substantially parallel sides). In this embodiment, the holes 26 may have a width between 2 to 5 mm, and a length between 10 to 40 mm.

Figure 6:
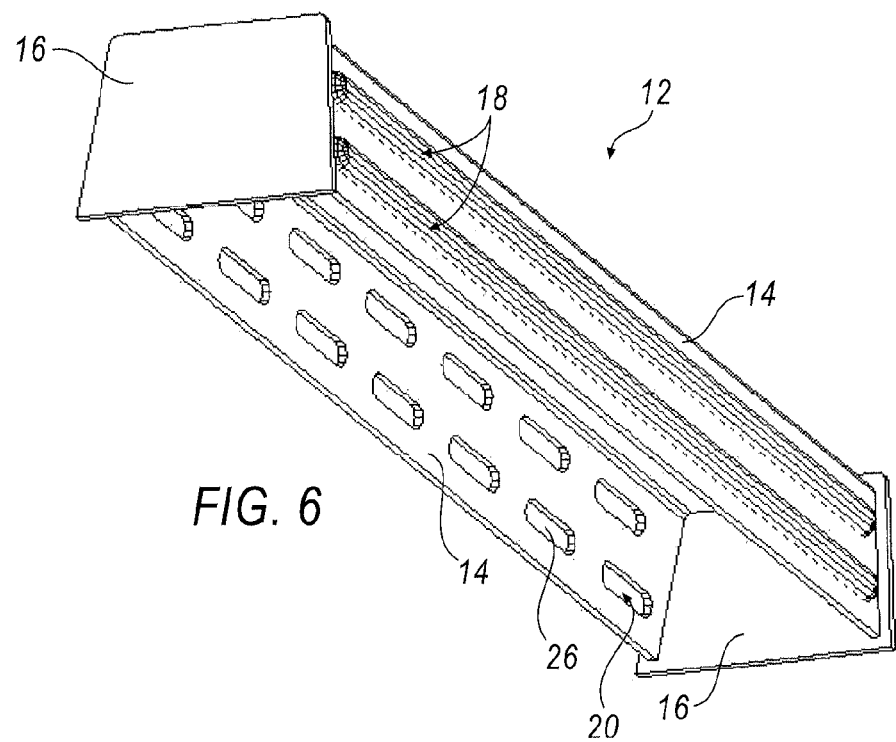
FIG. 6 is a perspective view of the carrier of FIG. 5 wherein two adhesive beads are disposed over the plurality of holes, according to an embodiment.

Referring to FIG. 6, the material layer 18 may be disposed on the walls 14 over the holes 26 so that the holes 26 may at least partially support the material layer 18. As illustrated, the material layer 18 is represented by two adhesive beads disposed on the wall 14 over the holes 26, although the material layer 18 may alternatively be the structural or acoustic foam. For example, FIGS. 7A-7C are partial cross-sectional views of the structural or acoustic foam disposed on the carrier 12 and being supported by the holes 26. In FIG. 7A, the holes 26 may have edges that are perpendicular to the outer surface of the carrier 12, or as illustrated in FIGS. 7B and 7C, the edges of the holes 26 may be angled relative to the outer surface of the carrier 12 from, for instance, the angle α may be 10 to 30 degrees. Angling the edges allows the hole 26 to better support the material layer 18 (i.e., the structural or acoustic foam), especially after baking. Moreover, referring to FIG. 7C, the support feature 20 may include a combination of holes 26 and integrally formed ribs 22. Similarly, FIGS. 8A-8C illustrates the same principles as FIGS. 7A-7C, respectively, but using an adhesive as the material layer 18. The embodiments of FIGS. 8B and 8C have as similar angle α as in FIGS. 7B and 7C.

Figure 9:
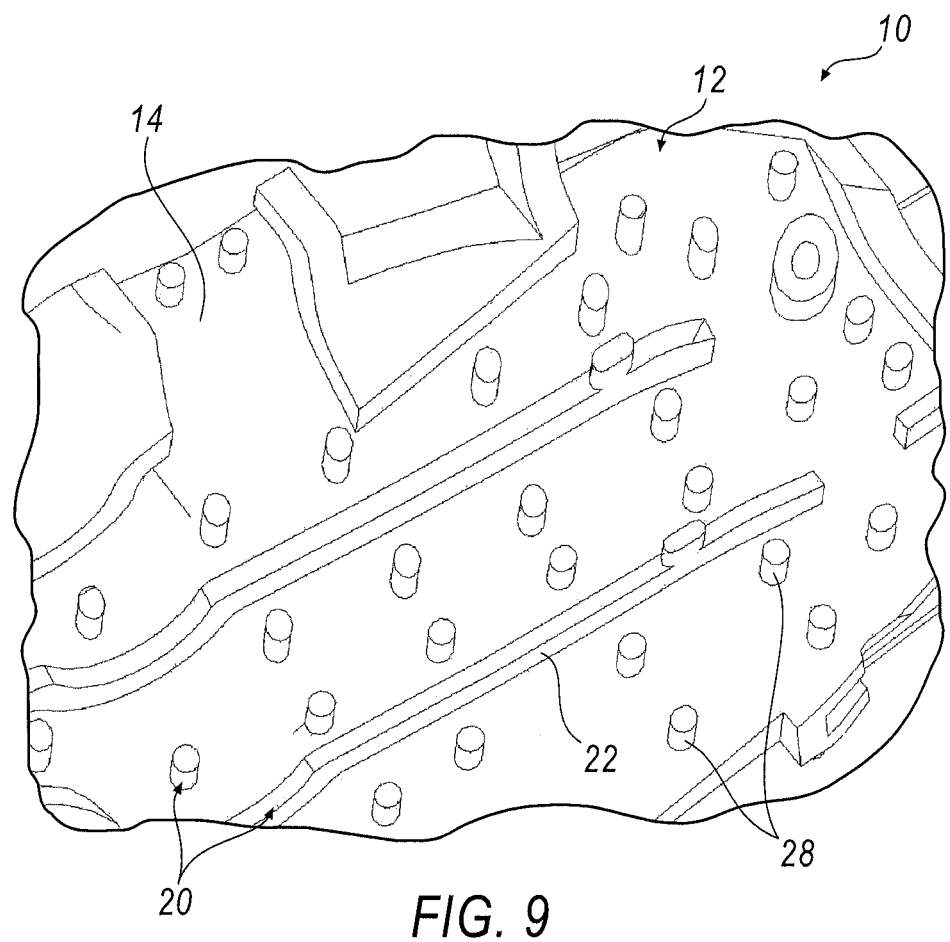
FIG. 9 is a perspective view of a surface of the carrier wherein the support feature includes the plurality of ribs and a plurality of pins, according to an embodiment.

FIG. 9 is a perspective view of a portion of the reinforcement 10 where the support feature 20 includes ribs 22 and a plurality of pins 28 integrally formed with and extending from a surface of one of the walls 14. The pins 28 may have a diameter of 2 to 4 mm, and a height that generally corresponds to the thickness of the unexpanded material layer 18. That height may be 2-6 mm for expandable materials, or 0.5-6 mm for adhesives. The material layer 18, although not shown in FIG. 9, is at least partially supported on the carrier 12 by the pins 28. It may be appreciated that the pins 28 may be used in combination with any of the previous embodiments discussed. For example, the pins 28 may be integrally formed with the ribs 22, or integrally formed on walls 14 having holes 26.

Figure 10:
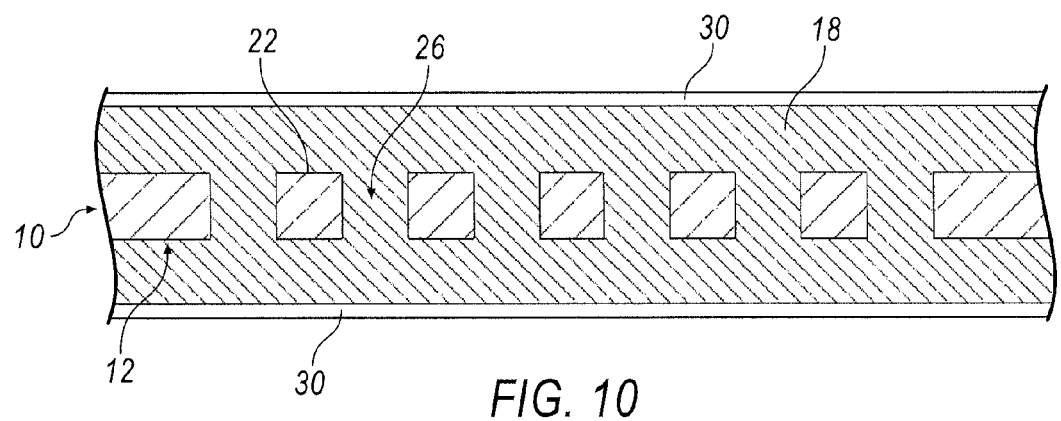
FIG. 10 is a partial cross-sectional view the carrier disposed between two panels and wherein the support feature includes a rib having the plurality of holes and the structural or acoustic foam disposed therebetween, according to an embodiment.
Figure 11:
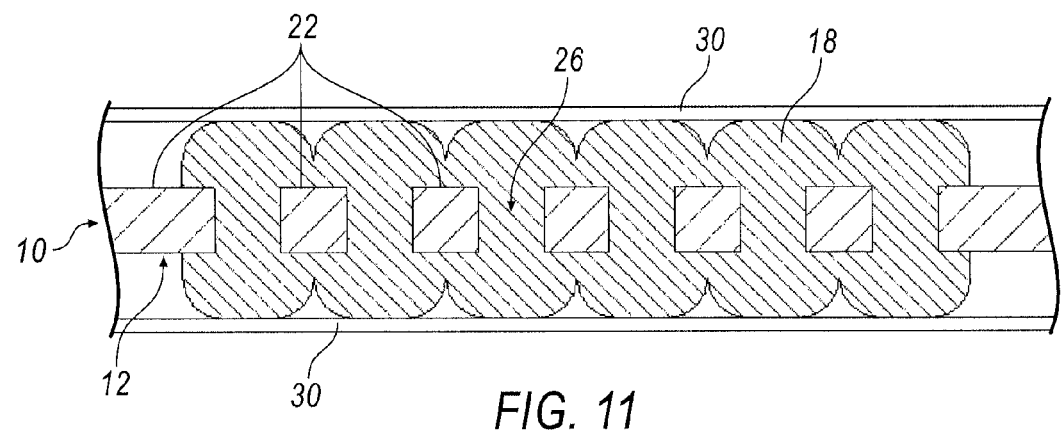
FIG. 11 is a partial cross-sectional view of the carrier disposed between two panels and wherein the support feature includes a rib having the plurality of holes and the adhesive disposed therebetween, according to an embodiment.

In one embodiment, the material layer 18 may be disposed on a support feature 20 between two panels 30 of a product being reinforced. FIGS. 10 and 11 are cross-sectional views of a single rib 22 defining a plurality of holes 26 and being disposed between the two panels 30. In this embodiment, the carrier 12 may be a single wall 14 of plastic or metal that is approximately equidistant between the two panels 30. Here, the wall 14 is the support feature 20 (i.e., the single rib 22). The material layer 18 is disposed on the rib 22, and when the material layer 18 expands, it fills the holes 26 and the space between the panels 30 such that the material layer 18 connects the two panels 30 through the wall 14. FIG. 10 illustrates this embodiment with acoustic foam, and FIG. 11 illustrates this embodiment with the adhesive. Moreover, although not illustrated, the support feature 20 may further include the plurality of pins 28 extending from the ribs 22. The embodiments of FIGS. 10 and 11 may be used when the distance between the panels 30 is narrow, such as 15 to 25 mm.

The material layer 18 is generally weakest at the edges of the carrier 12 because the material layer 18 and the carrier 12 tend to delaminate during storage, shipment, manipulation, and processing. FIGS. 12-14B illustrate embodiments to improve the interface between the material layer 18 and the carrier 12 at the edges of the walls 14.

Figure 12:
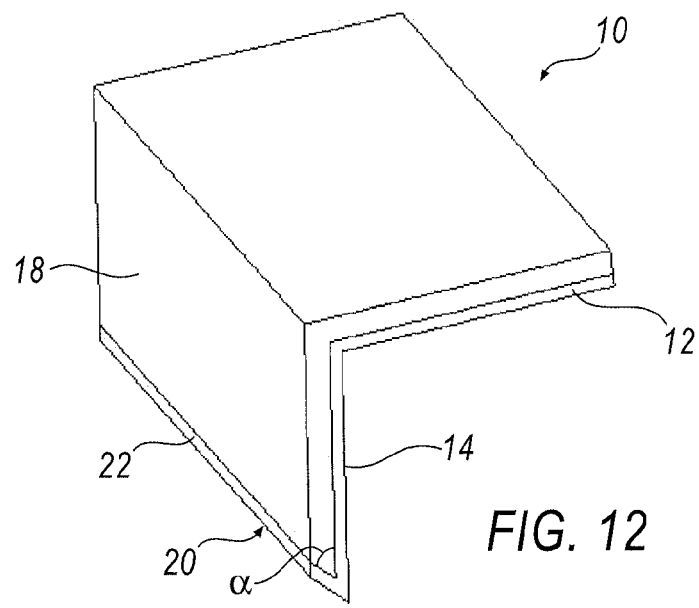
FIG. 12 is a perspective view of the carrier wherein the support feature includes a rib extending from an edge of a wall perpendicular to a molding direction and at an angle relative to the wall, according to an embodiment.

FIG. 12 is a partial view of one embodiment of the carrier 12 and material layer 18. In this embodiment, the carrier 12 includes the support feature 20 integrally formed with and extending from an edge of one of the walls 14. As in the previous embodiments, the material layer 18 is disposed on the wall 14 and is at least partially supported by the support feature 20. Specifically, the support feature 20 in this embodiment is a rib 22 extending from the edge of the wall 14 at an angle α relative to the wall 14. The angle α may be any angle that supports the material layer 18, such as between 10 degrees and 60 degrees, and specifically, 30 to 45 degrees. This negative draft angle design may help support the material layer 18 and reduce any weak interfaces between the edge of the carrier 12 and the material layer 18. In this embodiment, the rib 22 may extend continuously along the edge of the carrier 12, or be divided into segments along various sections of the edge. As shown in FIG. 12, the rib 22 extends from the wall 14 in a direction perpendicular to a molding direction, but this concept may also be used in extruded carriers 12 where the ribs 22 are in the extruded direction.

Figure 13:
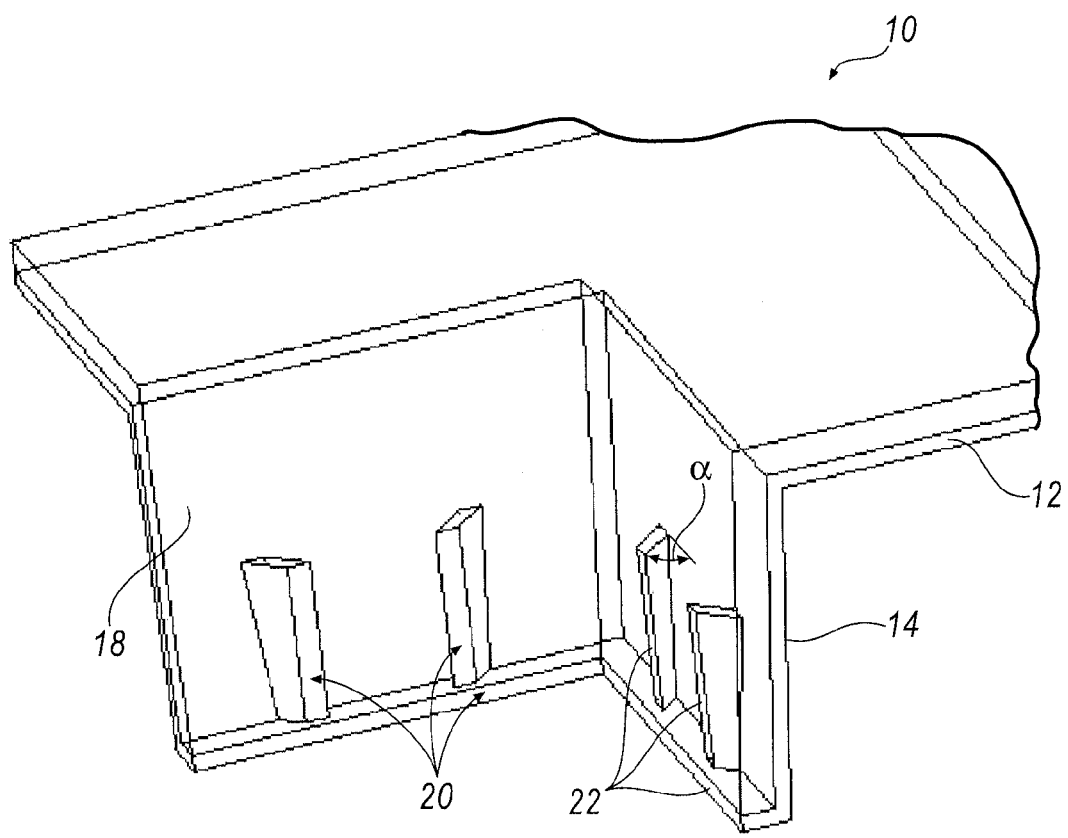
FIG. 13 is a perspective view of the carrier wherein the support feature includes ribs extending from the wall parallel to the molding direction and at an angle relative to the wall, according to an embodiment.

Alternatively, referring to FIG. 13, the rib 22 may extend from the wall 14 in a direction parallel to a molding direction. As in the previous embodiment, the rib 22 may be angled relative to the wall 14 at any angle that can support the material layer 18, such as between 10 and 60 degrees, and specifically, between 30 and 45 degrees. Moreover, multiple ribs 22 may be used in this embodiment. For example, the wall 14 may include a plurality of ribs 22 spaced from one another and each having the same, complimentary, and/or unique angles. The ribs 22 in this embodiment may have various heights, such as 2 to 20 mm, and specifically 6 to 10 mm. The distance between the ribs 22 may be 6 to 50 mm.

Figure 14A:
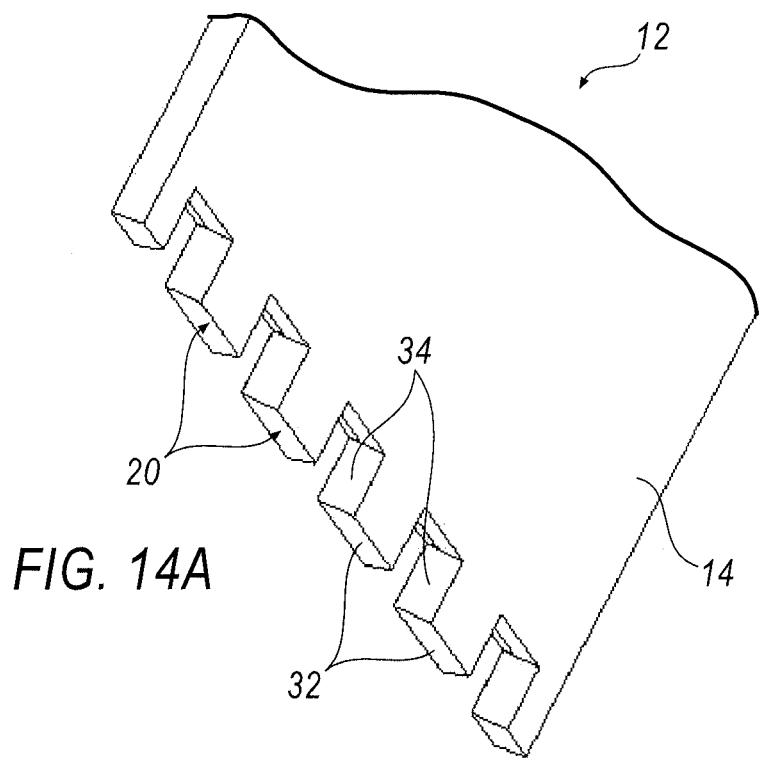
FIG. 14A is a perspective view of yet another embodiment of the carrier wherein the support feature includes a plurality of wedges extending from an edge of the wall, according to an embodiment.
Figure 14B:
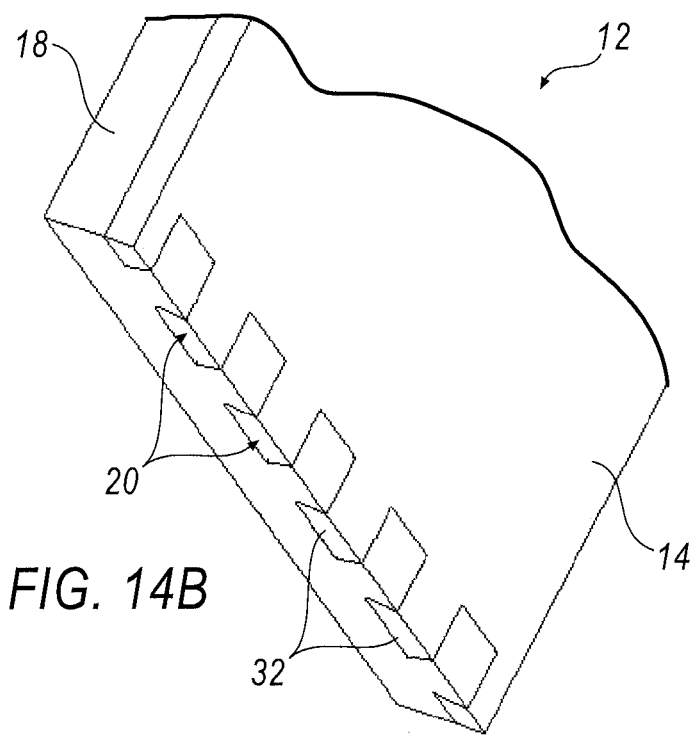
FIG. 14B is a perspective view of the carrier of FIG. 14A with the structural or acoustic foam disposed on the carrier, according to an embodiment.

In another embodiment, instead of a rib 22 extending from the edge of the wall 14, referring to FIGS. 14A and 14B, the support feature 20 may include a plurality of wedge portions 32 extending from the edge. The wedge portions 32 have a beveled edge 34 and are spaced from one another to help retain the material layer 18. This means that the wedge portion has an open section that is smaller on the outer surface of the carrier 12 in contact with the material layer 18 than on the inner surface. Generally, the width of the wedge portion may be 5 to 20 mm and the depth may be 2 to 5 mm. FIG. 14B illustrates the material layer 18 disposed on the carrier 12 and interacting with the wedge portions 32. Even though structural or acoustic foam is illustrated, the adhesive may also be used with the support feature 20 disclosed in the embodiment of FIGS. 14A and 14B.

Instead of integrally forming the support features 20 with the walls 14 of the carrier 12, in another embodiment, a connector pin 36 may be used to connect the carrier 12 to the material layer 18. Such an embodiment may be useful when the material layer 18 has reduced adhesive properties. Referring to FIGS. 15A-15D, the connector pin 36 includes a rigid portion 38 configured to extend through a hole in the carrier 12 and the material layer 18. As illustrated, the rigid portion 38 has a cylindrical cross-section, although the rigid portion 38 may have other configurations. A head portion 40 is integrally formed with the rigid portion 38 and rests on either the carrier 12 or the material layer 18. The head portion 40 has a generally circular periphery and is rounded on at least one side. The connector pin 36 further includes a deformable portion 42 integrally formed with and adjacent to the rigid portion 38 opposite the head portion 40. The deformable portion 42 has a cylindrical cross-section that is at least partially hollow and open at one end.

Figure 15A:
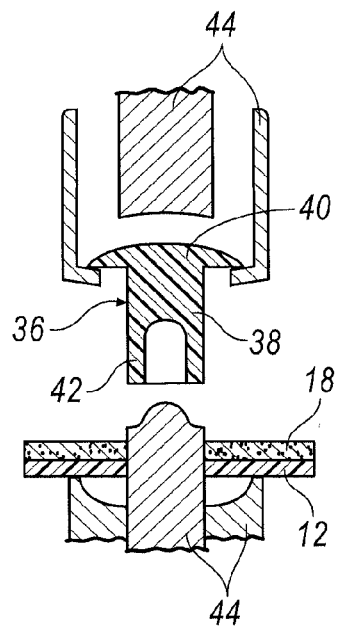
FIGS. 15A-15D are cross-sectional views of a connector pin being inserted into a carrier and material layer and deformed to secure the carrier to the material layer, according to an embodiment.
Figure 15B:
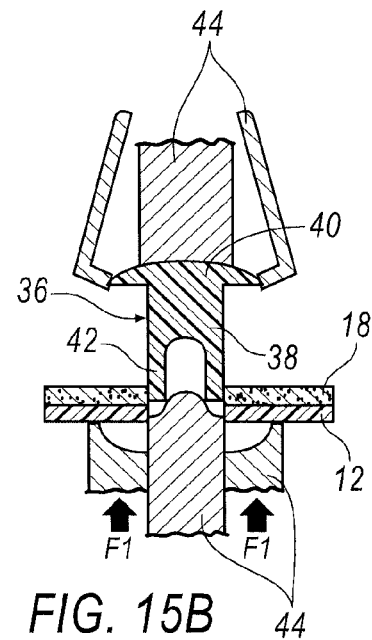
Figure 15C:
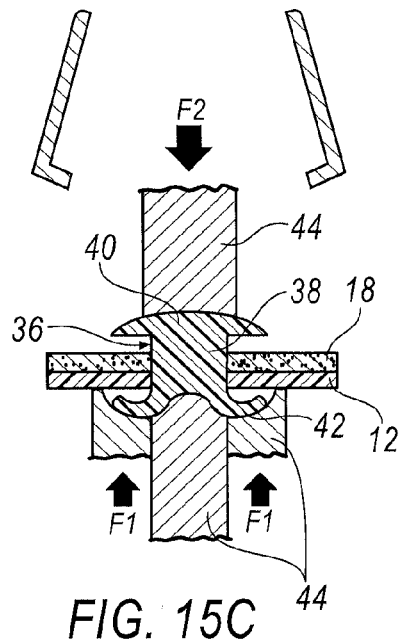
Figure 15D:
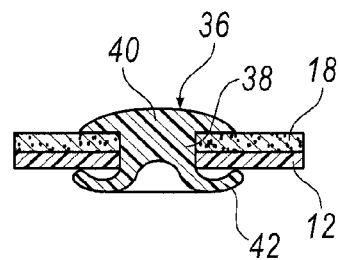
Figure 16:
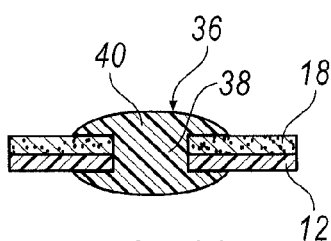
FIG. 16 is a cross-sectional view of a connector pin having a different configuration than the connector pin of FIGS. 15A-15D being deformed to secure the carrier to the material layer, according to an embodiment.

A tool 44 may be used to insert the connector pin 36 into the holes of the carrier 12 and the material layer 18, and to deform the connector pin 36 to attach the carrier 12 and material layer 18. As shown in FIG. 15A, the tool 44 may grip the head portion 40 of the connector pin 36, and as illustrated in FIG. 15B, the tool 44 may insert the connector pin 36 into aligned holes 26 defined by the carrier 12 and the material layer 18. In addition, the tool 44 may be inserted into the deformable portion 42 of the connector pin 36 and deform the connector pin 36 by applying a first force F1 to the deformable portion 42 of the connector pin 36 and simultaneously applying a second force F2 to the head portion 40 of the connector pin 36 in a direction opposite the first force F1, as illustrated in FIGS. 15B and 15C. This way, the tool 44 applies the first force F1 against an inside surface of the deformable portion 42, which causes the deformable portion 42 to bend away from a center of the connector pin 36 and hold the material layer 18 against the carrier 12, as illustrated in FIG. 15D. In another embodiment, the connector pin 36 may have a tube-shaped configuration before being deformed, and both ends of the connector pin 36 may be deformed as illustrated with respect to the deformable portion 42 of FIG. 15A-15D. In this embodiment, the tool 44 would apply forces against the inside surfaces of the connector pin 36 at both ends. Alternatively, referring now to FIG. 16, the connector pin 36 may have a substantially solid cylindrical configuration before being deformed and be disposed in the hole defined by the carrier 12 and the material layer 18. In this embodiment, the tool 44 may be used to deform both ends of the connector pin 36 to secure the carrier 12 to the material layer 18. Specifically, instead of bending portions of the connector pin 36 away from the center of the connector pin 36, in this embodiment, the two ends of the connector pin 36 are collapsed about the carrier 12 and material layer 18.

Figure 17A:
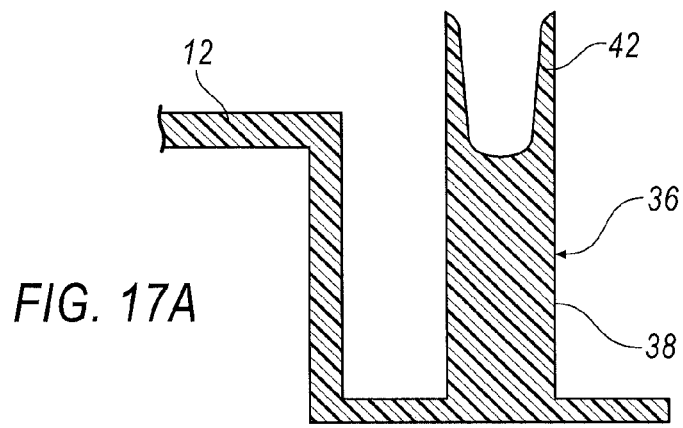
FIGS. 17A-17C are side views of a connector pin integrally formed with the carrier, according to an embodiment.
Figure 17B:
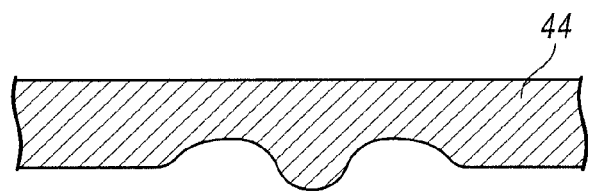
Figure 17B:
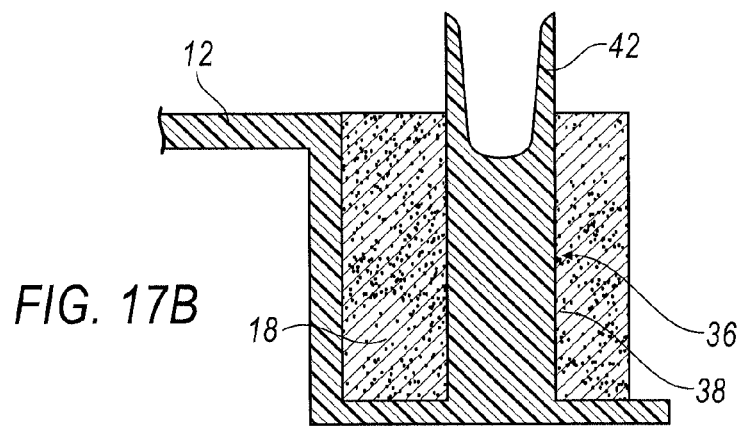
Figure 17C:
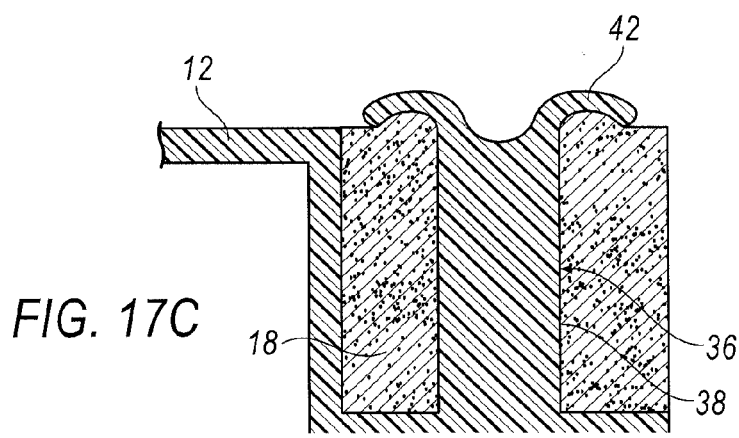

In yet another embodiment, the connector pin 36 may be integrally formed with the carrier 12, as illustrated in FIGS. 17A-17C. The connector pin 36 in this embodiment may include the rigid portion 38 and the deformable portion 42. As illustrated in FIG. 17B, the material layer 18 may be disposed on the carrier about the connector pin 36. Then, the tool 44 may be used to deform the deformable portion 42 to secure the material layer 18 to the carrier 12. Alternatively, the connector pin 36 having a tube-shaped or substantially solid cylindrical configuration may be integrally formed with the carrier 12 and deformed by the tool 44.

Various combinations of support features 20 may be used on any one carrier 12. For example, when shear or tensile forces are prevalent, an array of ribs 22 in combination with pins 28 may be ideal. However, when tensile forces are prevalent, an array of ribs 22, holes 26, and pins 28 may be ideal. It is appreciated that other combinations of support features 20 may be used or ideal in these or other situations. Moreover, the connector pin 36 may be used with any of the previous embodiments where the support feature 20 is integrally formed with the carrier 12.

In addition to the embodiments disclosed, the walls 14 of the carrier 12 may be treated with surface treatments to improve the bonding of the material layer 18 to the carrier 12. For example, the surface treatment may be used to improve bonding of structural foam to plastic or metal carriers 12, or the adhesive to metal. Various surface treatments include sandblasting, using an abrasive, pickling, using plasma, using a corona discharge, flaming, adhesive abrading, chromic acid etching, iodine treatment, use of primers, sodium treatment, surface grafting, surface roughening, thermal treatment, transcrystalline growth, and/or UV exposure. The surface treatment may also help improve the bonding of other materials.

The above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. In sum, it should be understood that the invention is capable of modification and variation and is limited only by the following claims.

The present embodiments have been particularly shown and described, which are merely illustrative of the best modes. It should be understood by those skilled in the art that various alternatives to the embodiments described herein may be employed in practicing the claims without departing from the spirit and scope as defined in the following claims. It is intended that the following claims define the scope of the invention and that the method and apparatus within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

We claim:

1. A reinforcement comprising:
   a carrier having at least one wall, said wall having an outer surface defined by a perimeter;
   a support feature disposed on said wall; and
   a material layer disposed on said outer surface of said wall and at least partially supported by said support feature;
   wherein said support feature includes at least a first rib integrally formed with and extending outwardly from said outer surface of said wall and wherein said rib forms an acute angle with said outer surface of said wall;
   wherein said support feature further includes a second rib integrally formed with and extending outwardly from a location on said outer surface of said wall that is spaced inward of said perimeter of said outer surface, said second rib forming an acute angle with said outer surface of said wall and being spaced apart from and aligned in parallel with said first rib.

2. A reinforcement as set forth in claim 1, wherein the acute angle is 10 degrees to 60 degrees.

3. A reinforcement as set forth in claim 1, wherein said material layer includes structural foam, acoustic foam, or an adhesive.

4. A reinforcement as set forth in claim 1, wherein said first rib and said second rib are angled toward each other.

5. A reinforcement as set forth in claim 1, wherein said carrier includes a plurality of walls.

6. A reinforcement as set forth in claim 1, wherein said first rib extends from a location on said outer surface of said wall that is spaced inward of said perimeter of said outer surface.

7. A reinforcement, comprising:
   a carrier having at least one wall, said wall having a first surface and an opposing second surface and at least one outer edge and a plurality of wedges spaced along at least a portion of said outer edge, said wedges having beveled edges such that the gap between two consecutive wedges at said first surface is smaller than the gap between the same two wedges at said second surface; and
   a generally planar material layer disposed on said first surface of said wall and including integral portions that are disposed between said wedges so as to at least partially secure said material layer to said first surface, wherein said material layer comprises at least one of a structural foam, an acoustic foam and an adhesive.

8. The reinforcement as set forth in claim 7, wherein said gap between two consecutive wedges gradually increases from said first surface to said second surface.

9. The reinforcement as set forth in claim 7, wherein said carrier includes a plurality of walls.

* * * * *